B. A. LINDERMAN.
MACHINE FOR DOVETAILING LUMBER.
APPLICATION FILED AUG. 22, 1910. RENEWED AUG. 2, 1912.
1,052,600.
Patented Feb. 11, 1913.
8 SHEETS—SHEET 1.
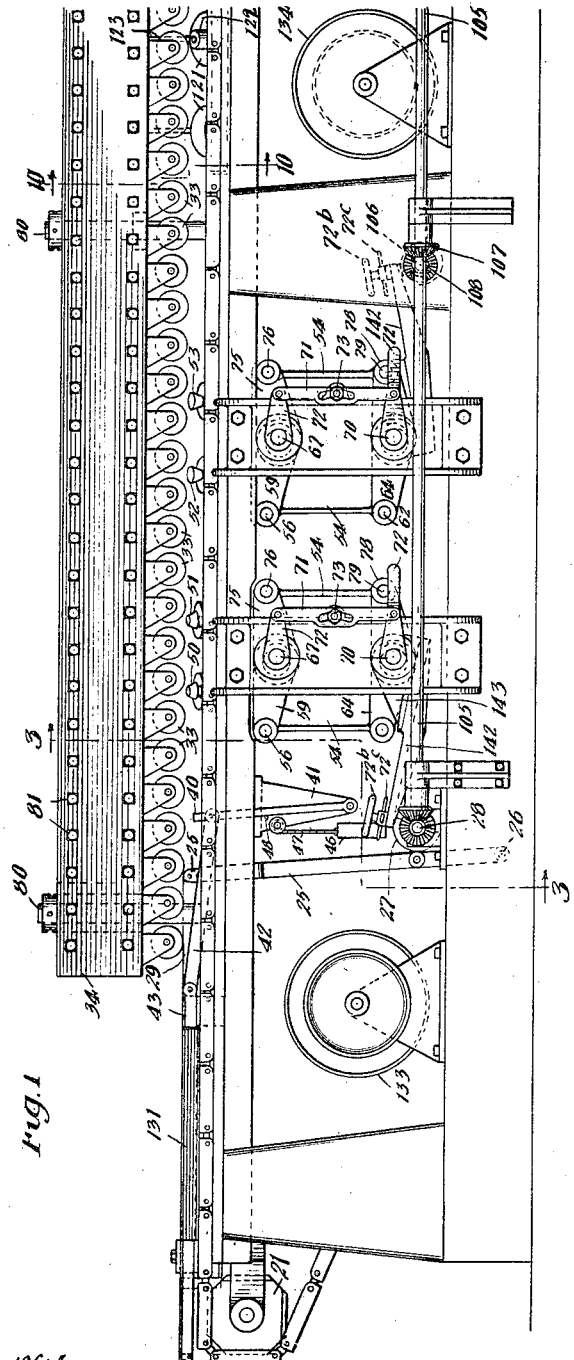
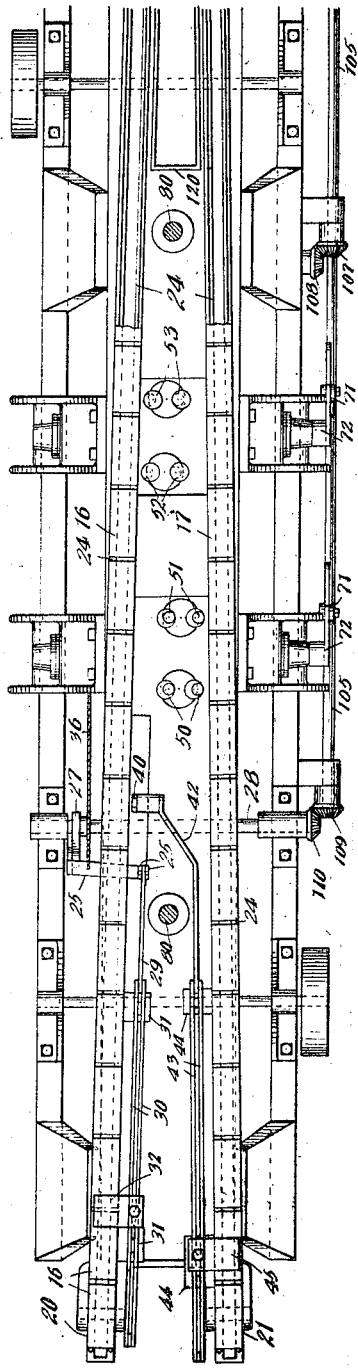
Witnesses
Wm. Geiger
Inventor:
Bert A. Linderman
By Munday, Evarts, Adcock & Clarke
Attorneys B. A. LINDERMAN.
MACHINE FOR DOVETAILING LUMBER.
APPLICATION FILED AUG. 22, 1910. RENEWED AUG. 2, 1912.
1,052,600.
Patented Feb. 11, 1913.
8 SHEETS—SHEET 2.
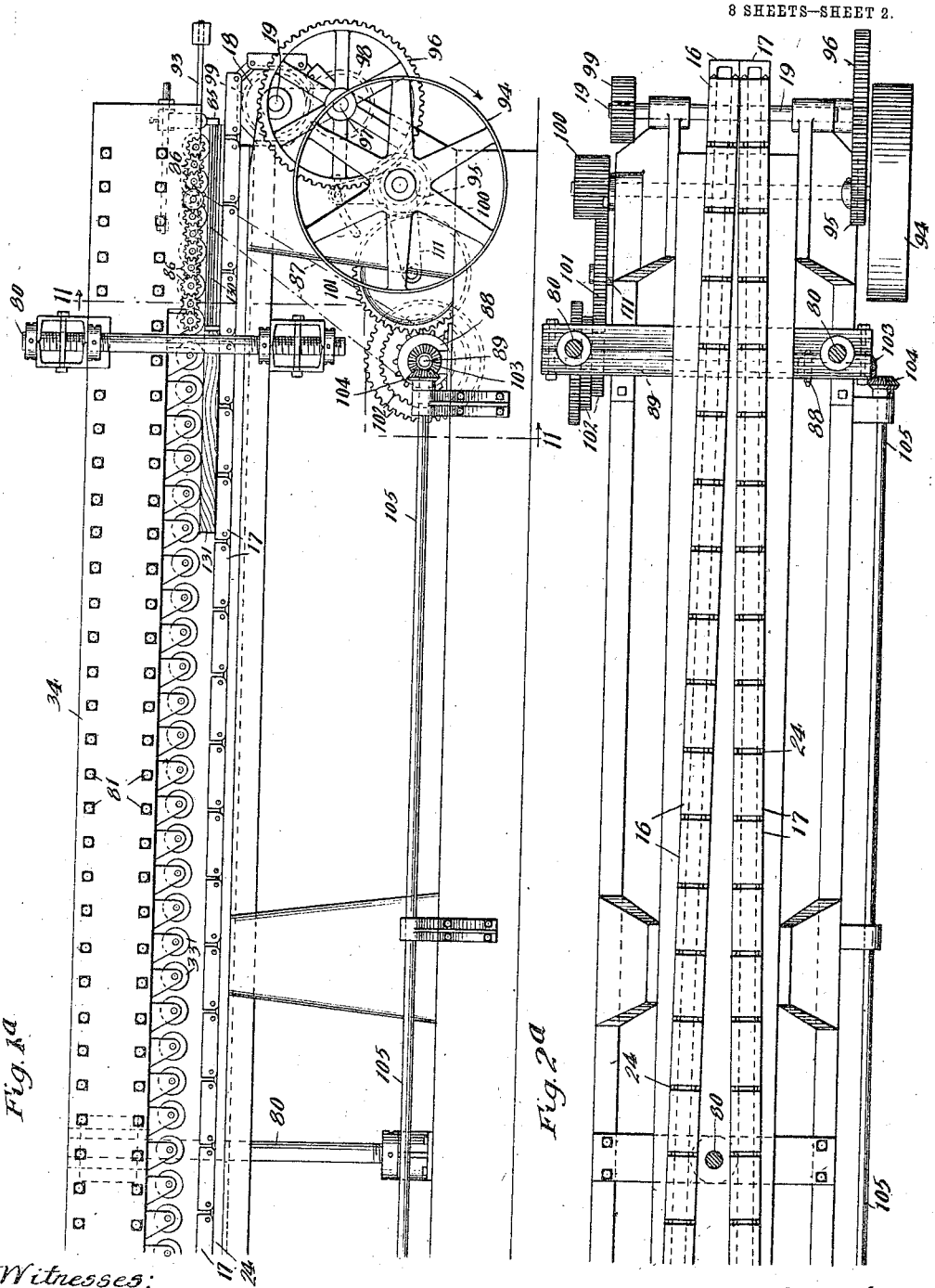
Witnesses:
Wm. Geiger
W. W. Munday
Inventor:
Bert A. Linderman
By Munday, Evarts, Adcock & Clarke.
Attorneys

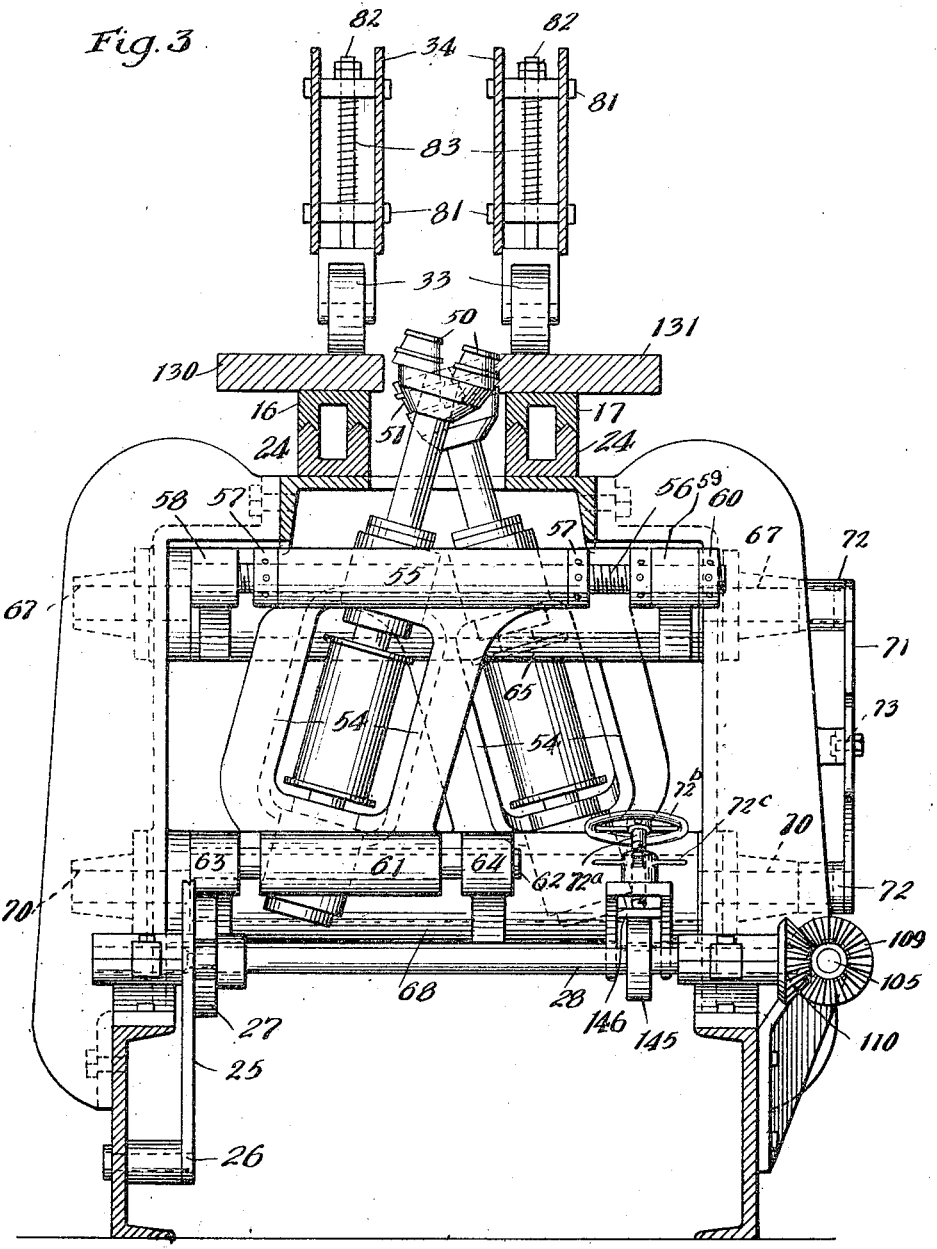

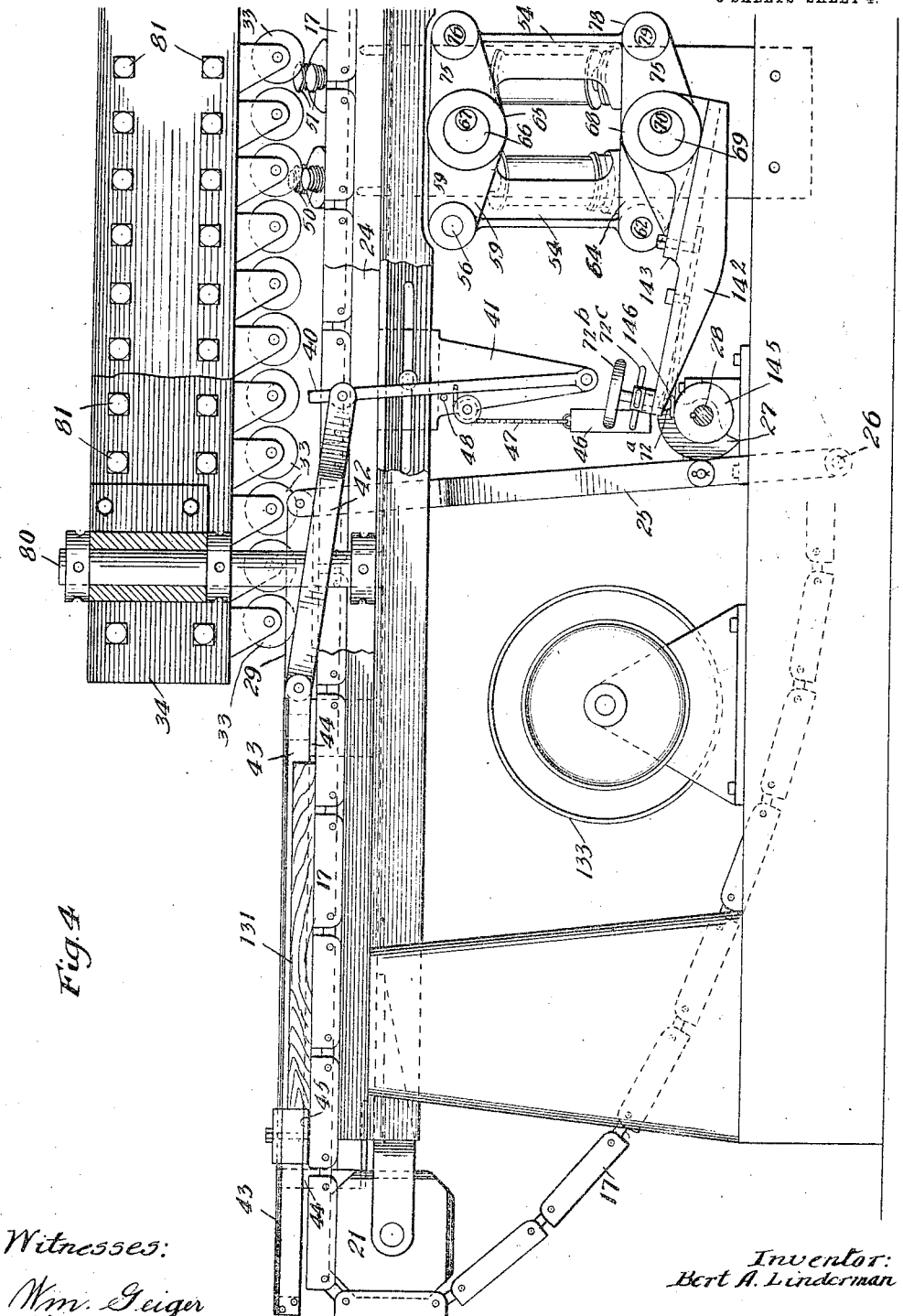

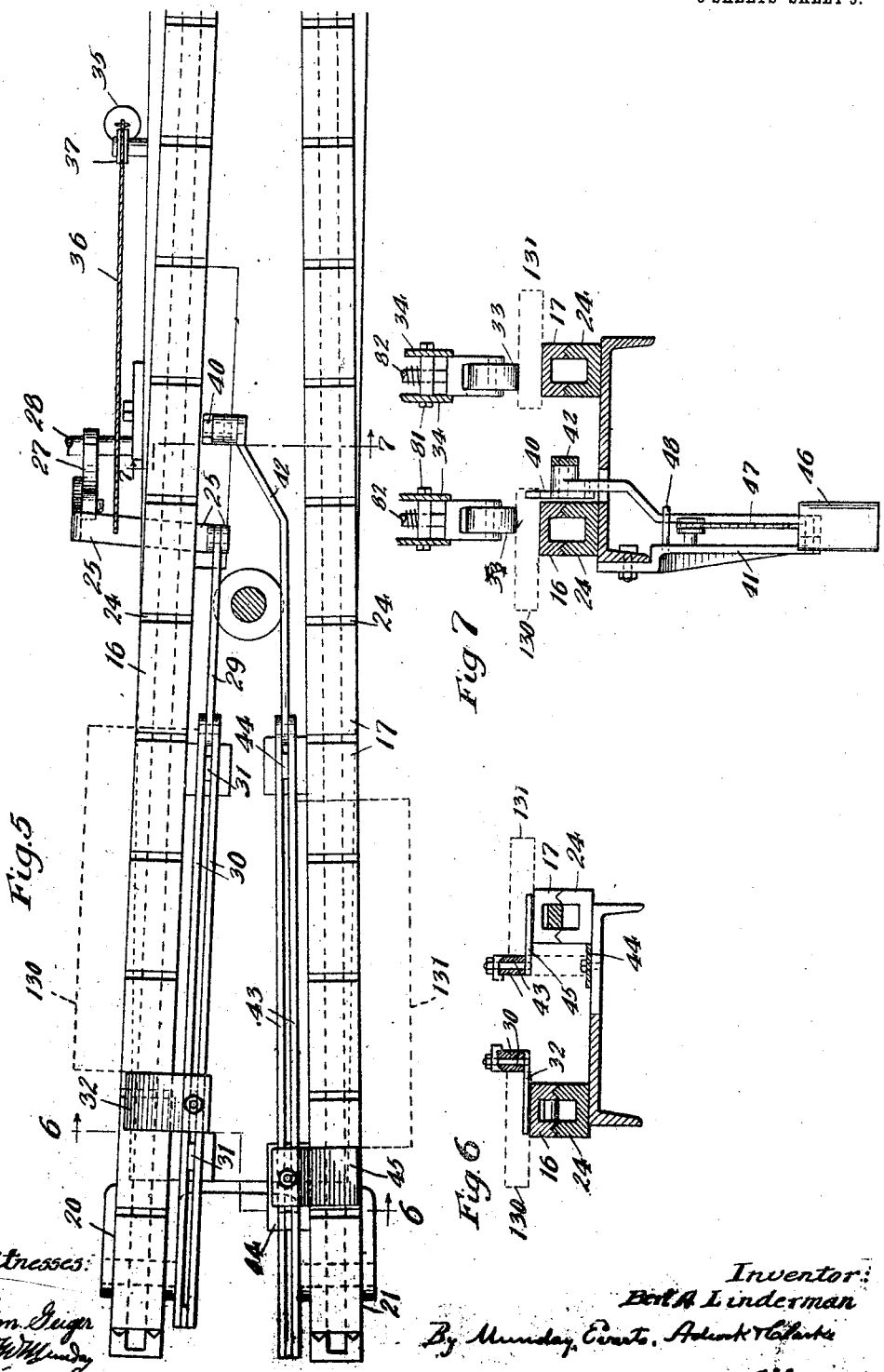

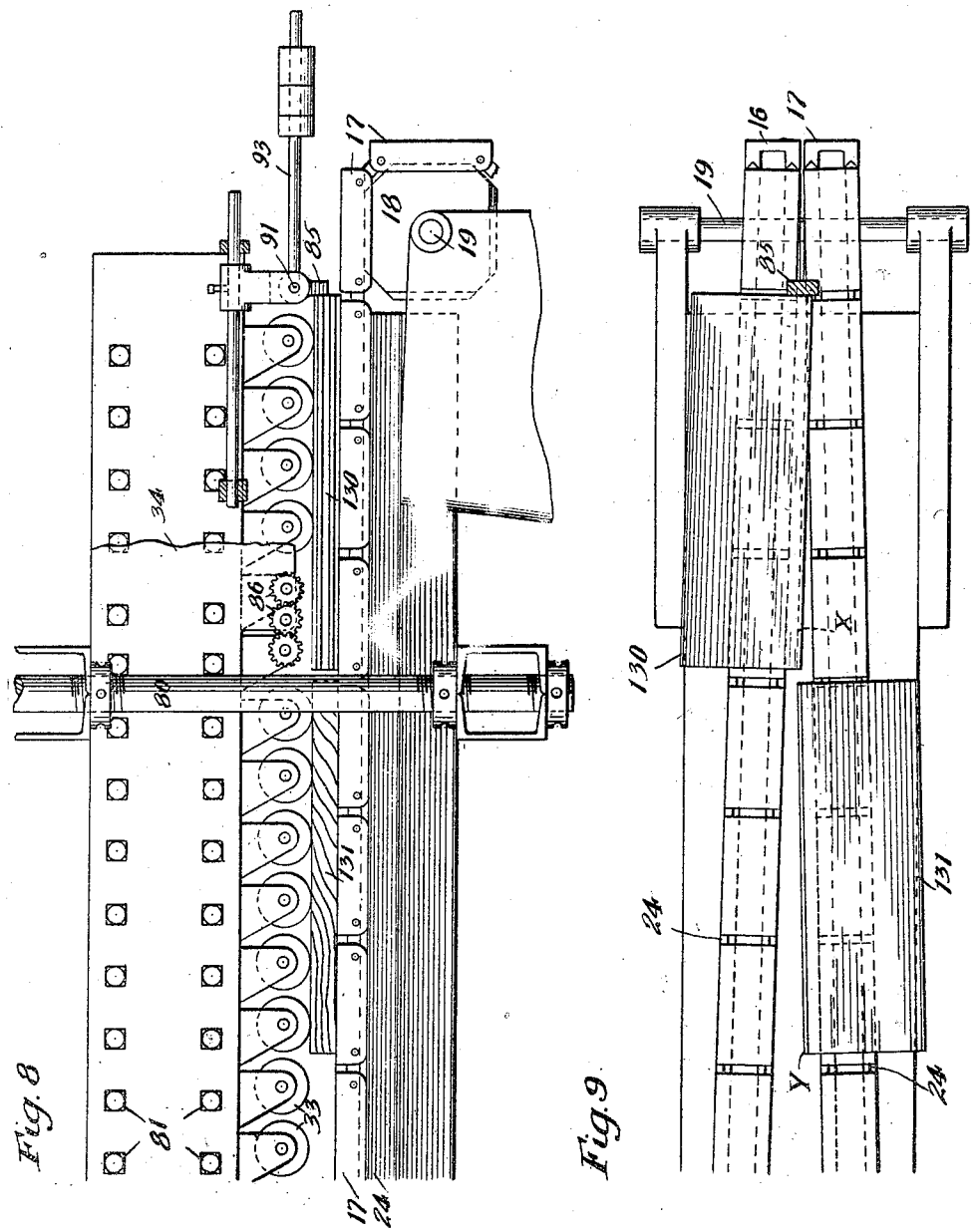

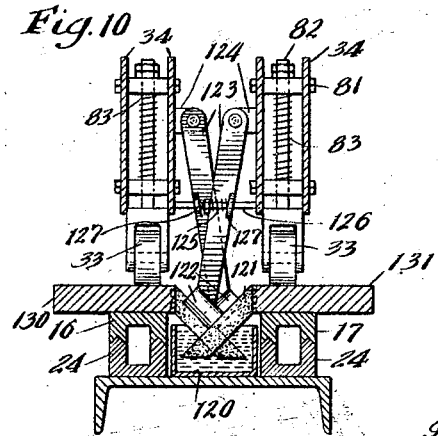
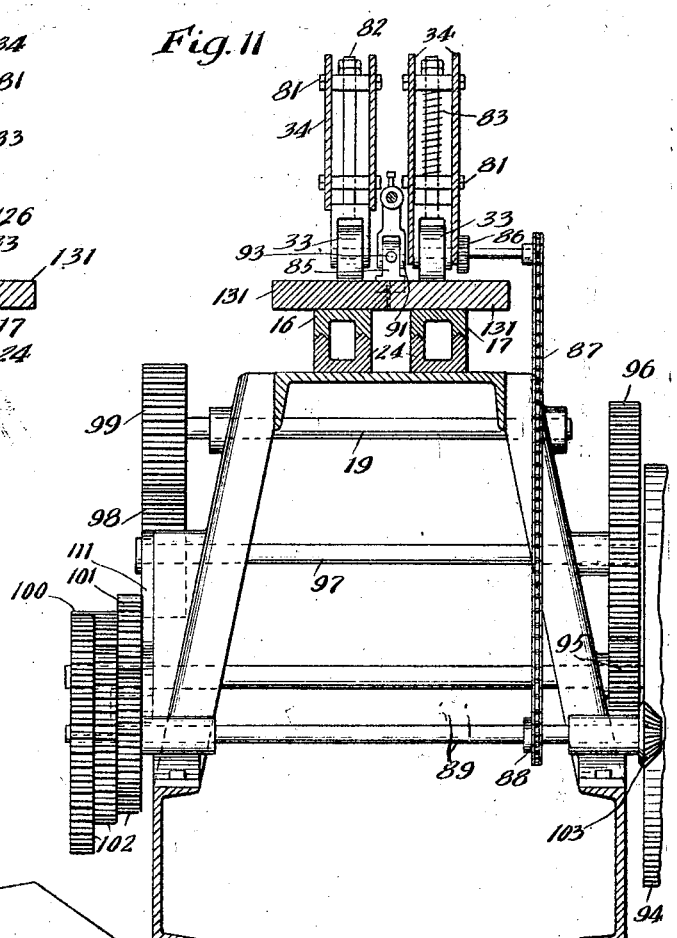
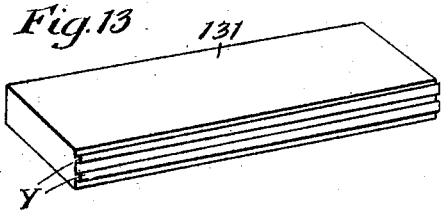
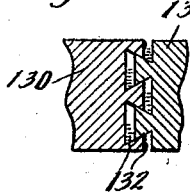
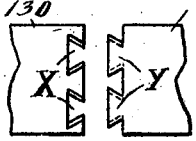

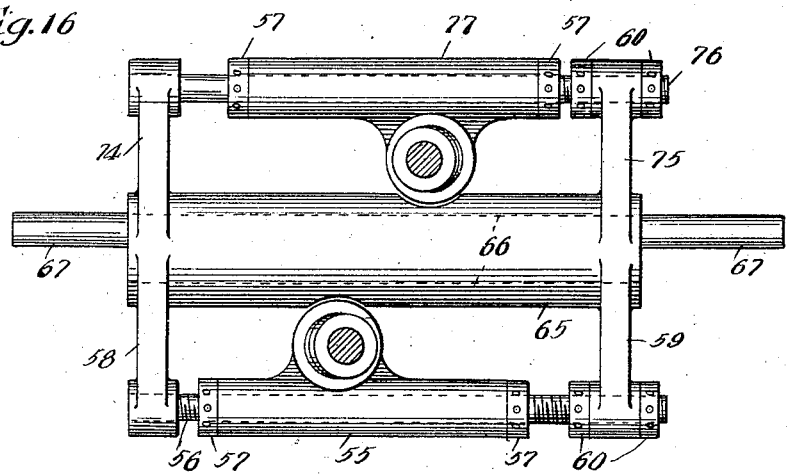
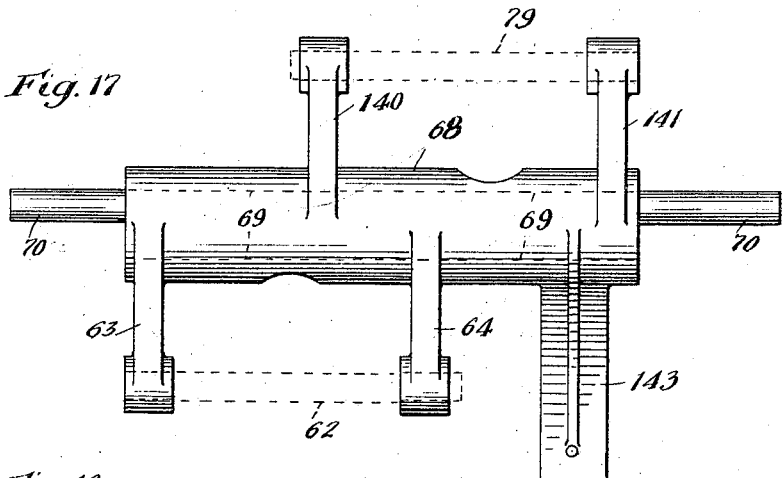
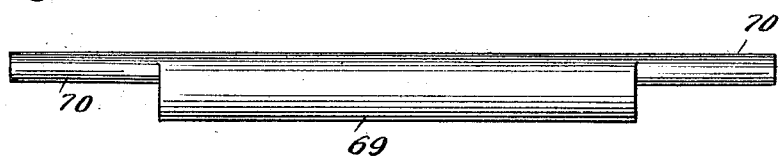

UNITED STATES PATENT OFFICE.

BERT A. LINDERMAN, OF MUSKEGON, MICHIGAN.

MACHINE FOR DOVETAILING LUMBER.

1,052,600.

Specification of Letters Patent. Patented Feb. 11, 1913.

Application filed August 22, 1910, Serial No. 578,288. Renewed August 2, 1912. Serial No. 713,003.

*To all whom it may concern:*

Be it known that I, BERT A. LINDERMAN, a citizen of the United States, residing in Muskegon, in the county of Muskegon and State of Michigan, have invented a new and useful Improvement in Machines for Dovetailing Lumber, of which the following is a specification.

This invention is designed to cut interfitting dovetails of the kind known as tapering dovetails in the edges of pieces of lumber, and without releasing or discharging the pieces to bring them together with the dovetails in engagement. The machine differs quite radically from the machines previously used in cutting similar dovetails upon the lumber and then uniting the pieces by threading the dovetails together, and is a marked simplification of such previous machines.

The nature of the present invention is fully disclosed below, and will be understood from the accompanying drawings forming a part of my description and in which drawings—

Figures 1 and 1ª are elevations of the side of my present machine, and Figs. 2 and 2ª are plan views of the machine with the presser rolls and their supports omitted, Figs. 1 and 2 showing the receiving end of the machine and Figs. 1ª and 2ª showing the discharging end thereof. Fig. 3 is a section on the line 3—3 of Fig. 1. Fig. 4 is a partial longitudinal vertical section of the receiving end of the machine. Fig. 5 is a partial horizontal section of the receiving end. Figs. 6 and 7 are sections on the lines 6—6 and 7—7 respectively of Fig. 5. Fig. 8 is a partial longitudinal vertical section of the discharging end. Fig. 9 is a horizontal section of the parts shown in Fig. 8, omitting the presser rolls. Fig. 10 is a section on the line 10—10 of Fig. 1. Fig. 11 is a section on the line 11—11 of Fig. 1ª. Figs. 12 and 13 are respective views of two pieces of lumber having interfitting dovetails cut on their edges and adapted to be united by the machine. Fig. 14 is a transverse section of two pieces of lumber with the dovetail tongues of one part entered in the grooves of the other. Fig. 15 shows end views of two pieces of lumber showing in full lines the end of one which is first engaged when the lumber is united by the machine and showing the same end of the other in broken lines. Fig. 16 is a plan of the upper eccentric and accompanying supports for the cutters, the mandrels of the latter being in section. Fig. 17 is a plan view of the lower eccentric and its surrounding cylinder detached. Fig. 18 is a like view of one of the eccentrics detached.

I employ two endless carriers for carrying the lumber to the cutters for forming the dovetails upon it, and for carrying the lumber into engagement with each other after the dovetails have been cut. These carriers are substantially parallel, being spaced apart at the receiving end to give room to the cutters and converge gradually toward the discharging end so that as they move together in the same direction and at the same speed, they are adapted to unite the lumber before discharging it. I show the carriers at 16 and 17 and they are operated by drum 18 on a power shaft 19 at the discharging end of the machine, and in returning to the receiving end they pass under the machine and thence up to and around the drums 20 and 21 at the receiving end. They consist of carriages of a suitable length and width, united by links 23, and the drums 18, 20 and 21 are each four sided, each side corresponding in size with the carriages. I do not employ any dogs with these carriages to feed the stock, but instead rely upon the pressure devices hereinafter described to insure the movement of the stock against the resistance of the cutters and while being united together. The drums 20 and 21 are separated from each other as shown at Fig. 2 so that a space may be left between the carriers sufficient to accommodate the cutters, and they are mounted on axes which are slightly inclined in opposite directions to permit the carriers when moving forward from said drums to converge and come together at the drum 18 at the discharge end of the machine. When moving from the drums 20 and 21 to the drum 18 the carriers travel over and are supported upon stationary tracks 24.

As both pieces of the stock travel in the same direction in the machine it is necessary that one of them be halted long enough to enable the other to be united to it by the threading together of the dovetails, and hence I employ starting devices for starting the pieces in their proper order and at proper times on the carriers with one of each pair of pieces leading the other by a space equal to its own length or a little more.

In this manner the pieces are made to arrive at the point where the dovetails first engage in their proper order and at the proper relative times. These starters are desirably constructed as follows: A lever 25 pivoted at its lower end upon a stationary pivot 26 is swung at proper intervals in feeding the lumber by a weight 35 attached to the lever by a rope 36 passing over pulley 37 and is returned to acting position and controlled by a slowly rotating cam 27 on cross shaft 28. At its upper end this lever is set off to the inner side of the carrier 16 and is pivotally joined to a link 29 which is pivoted between parallel bars 30 sliding on stationary supports 31 and carrying a laterally projecting pusher 32 adjustable along said bars, and movable over the carrier and acting to push the lumber forward upon the carrier until it enters under the presser rolls 33 attached to the bar 34, arranged longitudinally over the carrier 16.

For the lumber carried by carrier 17 I employ starting devices which are controlled by the starting devices of carrier 16 as follows: A vertical lever 40 is pivoted stationarily at its lower end to a depending leg 41 and projects upward into the path of the stock passing over carrier 16. Said lever is pivotally joined to a link 42 which in turn is pivoted to sliding parallel bars 43 moving over supports 44 and carrying a pusher 45 similar to 32, adapted to engage the stock and move it forward upon carrier 17 and under presser rolls of that carrier which are similar to the rolls 33 of carrier 16, both the carriers being similarly equipped with presser devices throughout their length except that in one of them the presser rolls at the discharge end may be positively driven as hereinafter explained, and in the other the pressers are deprived of their springs at the discharge end. The lever 40 is actuated in the performance of its function by its contact with the stock being fed by carrier 16 and it is returned to its starting position after each operation by the weight 46 and cord 47, and its swinging movements are limited or controlled by the sidewise projecting pin 48 projecting from the leg 41. The pushers 32 and 45 described in this paragraph and the preceding one, are employed to insure both certainty and accuracy in positioning the pieces of lumber upon the carriers so that they may arrive at the point where they are united in proper relative order. Obviously if the lumber was simply laid on the carriers, without being acted on by the pushers it might be slow in acquiring the motion of the carriers and thus fail to arrive at the junction point at the proper time.

The dovetails are cut in the proximate edges of the lumber on the carriers by pairs of cutters 50, 51, 52 and 53. The cutters are each supported in an individual frame 54, and each frame 54 is adjustably supported by a horizontal screw 56 passing through a sleeve 55 at the top of the frame 54 and supported in arms 58 and 59 and having nuts 57 at each side of the sleeve, for positioning the frame sidewise so that it will cause the cutters to cut deeper or less deep as occasion requires. The screw itself may also be adjusted in said bearings and locked by nuts 60, 60. At the bottom the frame 54 is provided with a sleeve 61 which is fitted to and slides upon a stationary round bar 62 supported at its ends in arms 63 and 64. The arms 58 and 59 supporting the screw 56 are attached to a long cylinder 65 surrounding and forming a bearing for an eccentric 66 having spindles 67 at its ends whereby the eccentric may be turned in effecting adjustments. The arms 63 and 64 are attached to a second cylinder 68 surrounding and forming a bearing for a second eccentric 69 having the same dimensions as eccentric 66 and adapted to act in exact harmony with the latter in giving the taper to the dovetails and in the adjustments. Eccentric 69 is also provided with end spindles 70 similar to the spindles 67 and for the same purpose. In order to secure harmony in the action of the two eccentrics, their spindles 67 and 76 are coupled together by bars 71 and cranks 72 the bars having slots at their meeting ends through which locking bolts 73 may be passed.

The above described devices are such as are used to support the cutters 50 and 52 for instance, but the mate cutters 51 and 53 forming the other side of the same dovetails partially cut by cutters 50 and 52, both being identical in construction, are supported as follows: Cylinder 65 is also provided with outstanding arms 74 and 75 forming bearings for a screw 76 similar to screw 56, and passing through a sleeve 77 similar to sleeve 55 on the frame 54 of cutter 51 or 53, nuts 57 and 60 being also used. The bottom of said frame 54 is also provided with a sleeve 78 sliding on a round bar 79 supported in arms 140 and 141 projecting from the lower cylinder 68 inclosing eccentric 69. It will be seen from this that each pair of the cutters is supported wholly from the pair of eccentrics and also that the cutters of each pair are adapted to receive simultaneous vertical movement in opposite directions. To give them this movement I place a device 142 which I call a rocker under each pair of cutters. And upon this rocker is arranged a flat bottomed piece 143 which is integral with cylinder 68 and adapted to permit the rocker to be firmly bolted to it. The rocker 142 is thus firmly secured to the eccentric cylinder 68, and the forward end of the rocker rides upon a rotating cam 145 on shaft 28 and thereby the rocker is given a rocking motion which turns the cylinder 68 on its eccentric and thereby through the arms connecting the cylinder to the frames of cutters 50 and 51 the desired vertical movement is given to the cutters, actuating one frame upward at the same time the other frame is actuated downward. A flat spring 146 is interposed between the cam 145 and the rocker, and tends to maintain contact between those parts as well as to take the wear. A construction like the above is employed for raising and depressing cutters 52 and 53, the rocker being operated by a cam on shaft 106. It will be understood that when the low part of the cam is moving under the rocker that the latter will follow the cam and depress one of the cutters accordingly, and that in order to reverse this action it is only necessary to reverse the cam placing the high point where the low point was previously. By this construction I am enabled to impart a slow and gradual movement transverse to the line of movement of the stock, to the cutters, which results in giving a slight taper extending from end to end of the dovetails cut by the cutters. This taper may widen the dovetails, or it may narrow them, as desired, but it is always necessary that one pair of the cutters shall be so controlled as to cause a narrowing of the dovetails cut by them while the other pair of cutters are controlled so as to cause a widening of the dovetails cut by them. It is also necessary that the dovetails formed upon one piece of the stock shall be widest at the end which first engages with the other piece, and that the dovetails upon the latter shall be narrowest at the end which first engages, and the machine must be so arranged as to thus cut and present the dovetails for engagement. These results are readily secured in the machine shown by changing the cams operating the rockers.

The bars 34 supporting the presser feet 33 of the carriers are supported by posts 80. The posts are adapted to permit the vertical adjustment of the bars to adapt the machine to work different thicknesses of stock. The bars consist preferably of duplicate sheets of flat metal arranged in parallel position and united by cross bolts 81 in which the stems 82 of the presser feet have bearings. Springs 83 surround the stems and press the feet downward upon the stock so that the latter is held with a yielding pressure which may be increased by lowering the bars as will be understood.

The carriers both move at the same speed, but a stop 85 is placed across both carriers at the discharge end, and acts to arrest the pieces arriving by carrier 16 until they have become engaged with the pieces arriving by carrier 17. Owing to the timing of the pieces at the start, those on carriers 16 are about a length ahead of those on carrier 17, (see Fig. 9) as already explained, and consequently the pieces on the latter arrive in readiness to be engaged with the pieces on carrier 16 at the same instant practically that the latter are arrested by said stop. As the stuff is always brought together with the small end of the dovetails upon one piece in position to enter the wide end of the dovetails upon the other piece the threading of the dovetails together then proceeds owing to the continuous positive feeding of the piece on carrier 17 until the union is completed, the stop holding the piece on carrier 16 during the operation and until the piece on carrier 17 also reaches the stop. Before the pieces on carrier 16 reach the stop the downward pressure on them is mainly relieved by removing the springs 83 of such of the pressure rolls as may then be bearing upon them (see Fig. 11); at the same time the presser rolls bearing upon the stuff in carrier 17 while the dovetails are being united are converted from idlers to positively driven rolls by providing them with intermeshing pinions 86 and driving the series of pinions by a sprocket chain 87 from the sprocket wheel 88 on shaft 89 (see Figs. 1ª, 8 and 11). These positively driven presser rolls are adapted to force the united boards past the stop and discharge them, the stop being made yielding to permit this, and preferably consisting of a vertical plate 85, pivoted at 91, and a rod 93 extending forward from the plate and supporting a weight, this construction being best shown at Fig. 8. The weight should be heavy enough to resist the forward movement of the stuff on carrier 16, but not heavy enough to withstand the positively driven pieces on carrier 17. The carriers do not bring the dovetail stock into complete parallelism. I find that it is not necessary that they should do this. They however, do bring them into nearly parallel positions, and sufficiently so to permit the dovetails to begin their engagement, and as the pieces on carrier 17 are then being positively urged forward, the dovetails themselves will finish the operation of bringing the pieces into completely parallel positions by drawing the dovetails together and completing the joint between them. When both boards have arrived at the stop, the joint will be fully complete, and the united board may then be discharged.

The machine is driven by belt upon pulley 94. Upon the shaft of this pulley is a gear 95 meshing with a gear 96 on a shaft 97, and shaft 97 carries a gear 98 meshing with a gear 99 on shaft 19. On the same shaft with pulley 94 is a gear 100 driving an intermediate 101, meshing with a gear 102 on shaft 89. The shaft 89 also carries a bevel gear 103 meshing with a gear 104 on the longitudinal shaft 105, and shaft 105 carries motion to the two cross shafts 106 and 28 through bevel gears 107, 108, 109 and 110. The intermediate 101 is mounted on a lever 111 adapted to mesh with any of the series of gears 102, and thereby serve to give a different speed to the mechanism giving vertical motion to the cutters and starters, and to permit this gear 100 is made wide so it may mesh with the intermediate in the changed positions.

After the pieces of stock have moved beyond the cutters and had the dovetails formed upon them, they pass the glue vat 120 located between them and in which are two glue applying wheels adapted to contact with the dovetailed edges of the stock and be turned thereby. These wheels are shown at 121 in Fig. 10 and each is provided with a central stem inserted in the tubular bearing 122 attached to a lever 123. These levers are each pivoted at their upper ends to projecting ears 124 on the presser supporting bars, and have a spring 125 on a rod 126 passing through a lateral flange 127 on the lever and acting to press the wheel of the lever against the stock upon which it operates.

Two pieces of stock having tapered dovetails formed upon them are shown at Figs. 12 and 13, the piece 130 having the grooves with their large or wide end at X, and the piece 131 having the tongues with their narrow ends at Y. Fig. 14 shows two pieces similar to 130 and 131 being united, the dovetails being partially threaded together, and 132 shows the glue confined in the joint. Fig. 15 shows the ends of two dovetailed pieces of stock.

The eccentrics are adjusted so as to impart a greater or less movement to the cutter frame, by turning them in their bearings which may be done by applying power to the projecting spindles. The action of the flat springs 146 may be regulated by screw 72ª bearing thereon and operated by a hand wheel 72ᵇ and locked by a nut 72ᶜ having operating handles. The cutters are driven by belts from pulleys 133 and 134.

I claim:—

1. The machine for dovetailing lumber, having two separate carriers moving in the same direction and carrying the pieces past cutters by which dovetails are formed upon them, said carriers acting to bring the pieces together in position for the engagement of the dovetails, and means for halting one of the pieces while the other is being forced into engagement with it.

2. The machine for dovetailing lumber having two separate carriers moving in the same direction past cutters by which dovetails are formed upon the proximate edges of the stock, said carriers converging together and positioning the pieces so that the dovetails start into engagement with each other, and means for halting one of the pieces while the other continues in motion and thus forces the dovetails to complete their union.

3. The machine for dovetailing lumber having two separate carriers moving in the same direction and carrying the pieces past cutters by which tapering dovetails are formed upon them, said carriers acting to bring the pieces together in position for the engagement of the dovetails, and means for halting one of the pieces while the other is being forced into engagement with it.

4. The machine for dovetailing lumber having two separate carriers moving in the same direction past cutters by which tapering dovetails are formed upon the proximate edges of the stock, said carriers converging together and positioning the pieces so that the dovetails start into engagement with each other, and means for halting one of the pieces while the other continues in motion and thus forces the dovetails to complete their union.

5. The machine for dovetailing lumber having two separate carriers moving in the same direction and carrying the pieces past cutters by which dovetails are formed upon them, said carriers acting to bring the pieces together in position for the engagement of the dovetails, and means for starting the pieces on the carriers so they will arrive at the point where they unite at proper times.

6. The machine for dovetailing lumber having two separate carriers moving in the same direction past cutters by which dovetails are formed upon the proximate edges of the stock, said carriers converging together and positioning the pieces so that the dovetails start into engagement with each other, and means for starting the pieces on the carriers so they will arrive at the point where they begin to unite at proper relative times.

7. The machine for dovetailing lumber having two separate carriers moving in the same direction and carrying the pieces past cutters by which tapering dovetails are formed upon them, said carriers acting to bring the pieces together in position for the engagement of the dovetails, and means for starting the pieces on the carriers so they will arrive at the point where they unite at proper times.

8. The machine for dovetailing lumber having two separate carriers moving in the same direction past cutters by which tapering dovetails are formed upon the proximate edges of the stock, said carriers converging together and positioning the pieces so that the dovetails start into engagement with each other, and means for starting the pieces on the carriers so they will arrive at the point where they unite at proper times.

9. The combination with converging carriers and cutters for cutting tapering dovetails in the lumber to be united, of means pressing the lumber down upon the carriers, and means for arresting the pieces of lumber on one carrier, the pressers on the other carrier also acting as feeders of the lumber upon it during the uniting operation.

10. The combination with converging carriers and cutters for forming tapering dovetails upon the proximate edges of pieces of lumber carried by the carriers, of means for arresting the pieces on one of the carriers preparatory to uniting them to the piece upon the other carrier, said other carrier being adapted to force the dovetails of the pieces carried by it into the dovetails of the arrested pieces.

11. The combination with converging carriers and cutters for forming tapering dovetails upon the proximate edges of pieces of lumber carried by the carriers, of means for arresting the pieces on one of the carriers preparatory to uniting them to the pieces upon the other carrier, said other carrier being provided with driven presser rolls acting to feed the lumber on said carrier during the uniting operation.

12. The combination with converging carriers and cutters for forming tapering dovetails upon the proximate edges of pieces of lumber carried by the carriers, non-driven rolls for holding the stock down on the carriers, and means for arresting the pieces on one of the carriers, the presser rolls bearing on the arrested pieces being deprived of their depressing springs, and the presser rolls bearing upon the pieces being united to the arrested pieces being positively driven acting as feed devices.

13. The combination with cutters for forming tapering dovetails on the proximate edges of pieces of stock, and carriers moving in converging paths past the cutters and acting to carry the dovetailed pieces into engagement with each other, starters for starting the pieces upon said carriers so that those upon one carrier will be in advance of those on the other, and means for arresting the pieces on one carrier, the other carrier being adapted to force the pieces into engagement.

14. The combination with cutters for forming tapering dovetails on the proximate edges of pieces of stock, and carriers moving in converging paths past the cutters and acting to carry the dovetailed pieces into engagement with each other, starters for starting the pieces upon said carriers so that those upon one carrier will be in advance of those on the other, and means for arresting the pieces which are in advance, the carrier moving the delayed pieces being adapted to force them into engagement with the arrested pieces.

15. The machine for dovetailing lumber having two separate carriers moving in the same direction and carrying the pieces past cutters by which dovetails are formed upon them, said carriers acting to bring the pieces together in position for the engagement of the dovetails, means for starting the pieces on the carriers so they will arrive at the point where they unite at proper times, the starting of the pieces on one carrier being controlled by the pieces on the other carrier.

16. The machine for dovetailing lumber having two separate carriers moving in the same direction and carrying the pieces past cutters by which dovetails are formed upon them, said carriers acting to bring the pieces together in position for the engagement of the dovetails, means for starting the pieces on one of the carriers in advance of those on the other, and means for starting the pieces on said other carrier at a predetermined distance behind.

17. The machine for dovetailing lumber having two separate carriers moving in the same direction and carrying the pieces past cutters by which dovetails are formed upon them, said carriers acting to bring the pieces together in position for the engagement of the dovetails, means for starting the pieces on one of the carriers and means for starting the pieces on the other carrier, said last mentioned means being controlled by the first mentioned means.

18. The combination with the cutters and their supports, of the eccentrics on which the supports are pivoted, and the rocker and its actuating cam for moving the supports up or down.

19. The combination with the cutters and the supports in which they are carried, of an eccentric on which the supports are pivoted, and means essentially as set forth for operating said supports to raise or lower the cutters.

20. The combination with dovetail cutters supported on rocking devices at opposite sides of the axis of said devices, a rotating cam, and rocker for actuating the cutters receiving its motion from the cam.

21. The dovetail cutters mounted on arms projecting in opposite directions from rocking cylinders, in combination with said cylinders and means for rocking said cylinders.

BERT A. LINDERMAN.

Witnesses:
 MINNIE D. SILLEY,
 JOHN Q. ROSS.